US006822940B1

(12) United States Patent
Zavalkovsky et al.

(10) Patent No.: US 6,822,940 B1
(45) Date of Patent: Nov. 23, 2004

(54) METHOD AND APPARATUS FOR ADAPTING ENFORCEMENT OF NETWORK QUALITY OF SERVICE POLICIES BASED ON FEEDBACK ABOUT NETWORK CONDITIONS

(75) Inventors: Arthur Zavalkovsky, Hertzliya Pituah (IL); Gilad Zlotkin, Hertzliya Pituah (IL)

(73) Assignee: Cisco Technology, Inc., San Jose, CA (US)

( * ) Notice: Subject to any disclaimer, the term of this patent is extended or adjusted under 35 U.S.C. 154(b) by 748 days.

(21) Appl. No.: 09/675,206

(22) Filed: Sep. 29, 2000

(51) Int. Cl.[7] .......................... H04L 12/26; G01R 31/08
(52) U.S. Cl. ................... 370/237; 370/235; 370/395.21
(58) Field of Search ................................ 370/237, 229, 370/235, 231, 230, 235.1, 236, 333, 252, 389, 392, 400, 401, 395.2, 395.21, 395.52, 238, 238.1, 249, 395.4, 395.5, 469

(56) References Cited

U.S. PATENT DOCUMENTS

| | | | |
|---|---|---|---|
| 5,359,593 A | 10/1994 | Derby et al. ................. | 370/234 |
| 5,594,792 A | 1/1997 | Chouraki et al. ........... | 709/269 |
| 5,928,331 A | 7/1999 | Bushmitch .................. | 709/231 |
| 5,968,176 A | 10/1999 | Nessett et al. .............. | 713/201 |
| 5,970,064 A | 10/1999 | Clark et al. ................. | 370/351 |
| 6,009,081 A | 12/1999 | Wheeler et al. ............ | 370/255 |
| 6,021,263 A | 2/2000 | Kujoory et al. ............. | 709/232 |
| 6,021,439 A | 2/2000 | Turek et al. ................. | 709/224 |
| 6,028,842 A | 2/2000 | Chapman et al. ........... | 370/235 |
| 6,046,980 A | 4/2000 | Packer ........................ | 370/230 |
| 6,047,322 A | 4/2000 | Vaid et al. ................... | 709/224 |
| 6,061,725 A | 5/2000 | Schwaller et al. .......... | 709/224 |
| 6,104,700 A | 8/2000 | Haddock et al. ............ | 370/235 |
| 6,118,760 A | 9/2000 | Zaumen et al. ............. | 370/229 |
| 6,154,776 A | 11/2000 | Martin ........................ | 709/226 |

(List continued on next page.)

OTHER PUBLICATIONS

S. Blake, et al., "An Architecture for Differentiated Services," Dec. 1998, pp. 1–36.
D. Durham, et al., "The COPS (Common Open Policy Service) Protocol," Jan. 2000, pp. 1–38.
S. Herzog, et al., "COPS usage for RSVP," Jan. 2000, pp. 1–17.
R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1–105.

*Primary Examiner*—Douglas Olms
*Assistant Examiner*—Brian Nguyen
(74) *Attorney, Agent, or Firm*—Hickman Palermo Truong & Becker LLP

(57) ABSTRACT

A method and apparatus for adaptively enforcing Quality of Service (QoS) policies for one or more flows of packets in a packet-switched network based on network feedback information. In one aspect, packets of a first group of flows are assigned to a first service level. Then-current interface congestion information for network traffic that is mapped to the first service level and that is passing through an interface of a network device in the network is received. Based on the then-current interface congestion information one or more flows from the first group of flows are selected. Packets from the one or more flows are then assigned to a second service level.

17 Claims, 8 Drawing Sheets

U.S. PATENT DOCUMENTS

| | | | |
|---|---|---|---|
| 6,167,445 A | 12/2000 | Gai et al. | 709/223 |
| 6,169,748 B1 | 1/2001 | Barbas et al. | 370/468 |
| 6,212,184 B1 | 4/2001 | Venkatachary et al. | 370/392 |
| 6,286,052 B1 | 9/2001 | McCloghrie et al. | 709/238 |
| 6,301,253 B1 | 10/2001 | Ichikawa | 370/395.71 |
| 6,301,613 B1 | 10/2001 | Ahlstrom et al. | 709/223 |
| 6,324,184 B1 | 11/2001 | Hou et al. | 370/468 |
| 6,327,618 B1 | 12/2001 | Ahlstrom et al. | 709/223 |
| 6,363,429 B1 | 3/2002 | Ketcham | 709/235 |
| 6,393,473 B1 | 5/2002 | Chu | 709/223 |
| 6,401,240 B1 | 6/2002 | Summers | 717/130 |
| 6,424,659 B2 | 7/2002 | Viswanadham et al. | 370/469 |
| 6,430,154 B1 | 8/2002 | Hunt et al. | 370/395.43 |
| 6,442,151 B1 * | 8/2002 | H'mimy et al. | 370/333 |
| 6,463,470 B1 | 10/2002 | Mohaban et al. | 709/223 |
| 6,466,984 B1 | 10/2002 | Naveh et al. | 709/223 |
| 6,473,793 B1 | 10/2002 | Dillon et al. | 709/223 |
| 6,483,805 B1 * | 11/2002 | Davies et al. | 370/235 |
| 6,484,261 B1 | 11/2002 | Wiegel | 713/201 |
| 6,539,425 B1 | 3/2003 | Stevens et al. | 709/220 |
| 6,570,875 B1 | 5/2003 | Hegde | 370/389 |
| 6,577,644 B1 | 6/2003 | Chuah et al. | 370/466 |
| 6,594,268 B1 | 7/2003 | Aukia et al. | 370/400 |
| 6,601,082 B1 | 7/2003 | Durham et al. | 718/100 |
| 6,611,864 B2 | 8/2003 | Putzolu et al. | 709/223 |
| 6,621,793 B2 | 9/2003 | Widegren et al. | 370/230.1 |
| 6,622,170 B1 | 9/2003 | Harrison et al. | 709/211 |
| 6,651,191 B1 | 11/2003 | Vacante et al. | 714/47 |
| 6,671,724 B1 * | 12/2003 | Pandya et al. | 709/226 |
| 6,684,244 B1 | 1/2004 | Goldman et al. | 709/223 |

* cited by examiner

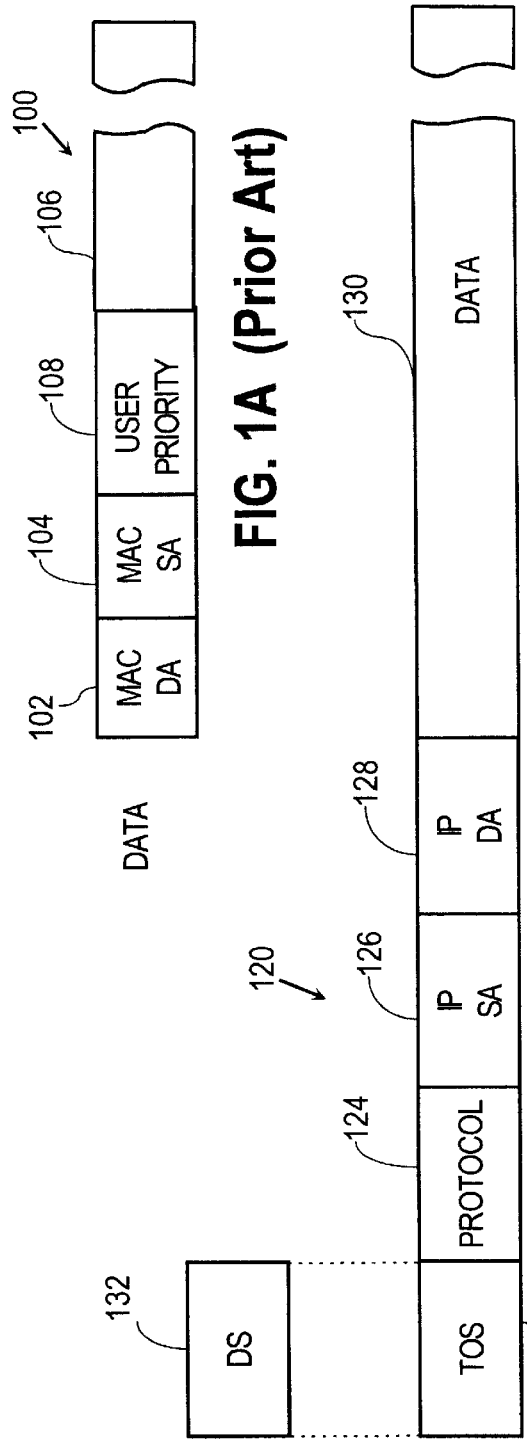
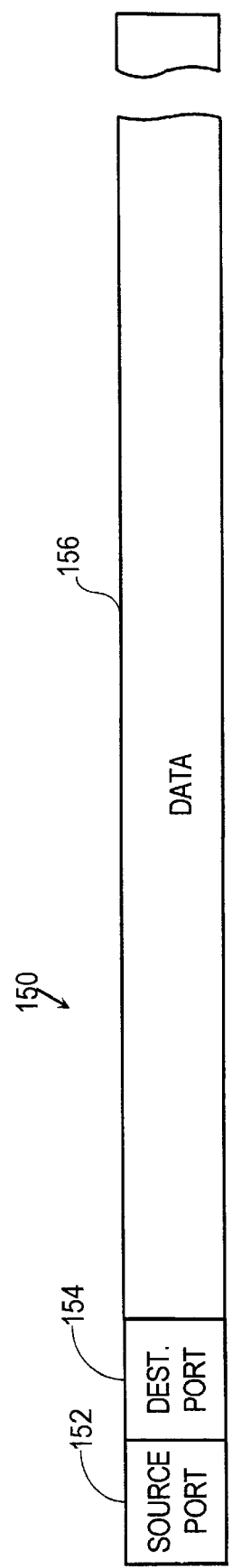
FIG. 1A (Prior Art)
FIG. 1B (Prior Art)
FIG. 1C (Prior Art)

420

| DSCP | SERVICE LEVEL | BUFFER |
|---|---|---|
| 55 - 63 | GOLD | 404 |
| 45 - 54 | SILVER | 406 |
| 0 - 44 | BRONZE | 408 |

422

| APPLICATION FLOW | DSCP | SERVICE LEVEL | BUFFER |
|---|---|---|---|
| VOIP | 63 | GOLD | 404 |
| HTTP | 55 | GOLD | 404 |
| EMAIL | 25 | BRONZE | 408 |

424

| APPLICATION FLOW | DSCP | SERVICE LEVEL | BUFFER |
|---|---|---|---|
| VOIP | 63 | GOLD | 404 |
| HTTP | 50 | SILVER | 406 |
| EMAIL | 25 | BRONZE | 408 |

430

| DSCP | SERVICE LEVEL | BUFFER |
|---|---|---|
| 55 - 63 | GOLD | 404 |
| 45 - 54 | SILVER | 406 |
| 25 - 44 | BRONZE | 406 |
| 0 - 24 | TIN | 408 |

440

| DSCP | SERVICE LEVEL | BUFFER |
|---|---|---|
| 55 - 63 | GOLD | 404 |
| 45 - 54 | SILVER | 406 |
| 25 - 44 | BRONZE | 408 |
| 0 - 24 | TIN | 408 |

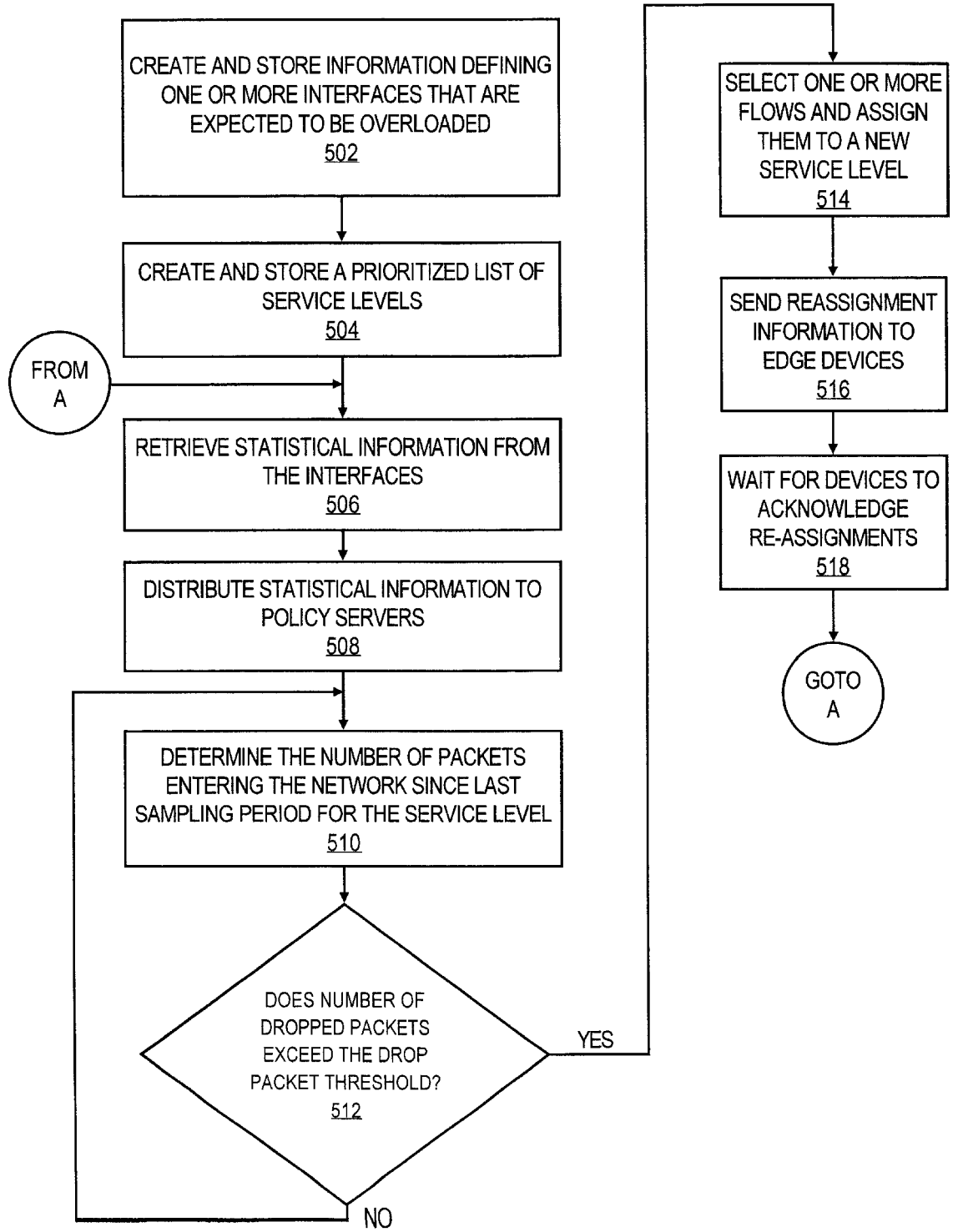

METHOD AND APPARATUS FOR ADAPTING ENFORCEMENT OF NETWORK QUALITY OF SERVICE POLICIES BASED ON FEEDBACK ABOUT NETWORK CONDITIONS

FIELD OF THE INVENTION

The present invention relates generally to computer networks, and more specifically, to a method and apparatus for adapting enforcement of network quality of service policies in a network system based on feedback about network conditions.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork generally known as the Internet or World Wide Web (WWW).

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP, which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message that is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2, which in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. Conventionally, IP data packets include a corresponding header that contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Additionally, the intermediate devices also include specific resources or services, such as a particular number of buffers or priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106. According to the 802.1Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

Differentiated Services

Currently, a Differentiated Services (DS) protocol is under development by the Internet Differentiated Services Working Group of the Internet Engineering Task Force (IETF). The main idea behind DS is the classification and possibly conditioning of traffic at network boundaries. The classification operation entails the assignment of network traffic to behavioral aggregates. The behavioral aggregates define a collection of packets with common characteristics that determine how they are identified and treated by the network.

To achieve the classification, the Internet Differentiated Services Working Group has proposed replacing the ToS field 122 of Network Layer packets 120 with a one-octet differentiated services (DS) field 132, which is assigned a differentiated services codepoint (DSCP) value between "0" and "63". (for additional details see RFC2474 "Definition of the Differentiated Services Field in the IPv4 and IPv6 Headers"). Layer 3 devices that are DS compliant ("DS nodes") apply a particular per-hop forwarding behavior to data packets based on the contents of their DS fields 132. This mechanism provides a method for dividing or allocating bandwidth of a network between the different flows, and is generally referred to as the per-hop-behavior (PHB). Examples of per-hop forwarding behaviors include expedited forwarding (EF) and assured forwarding (AF). Additional information on AF and EF forwarding can be found in RFC2597 and RFC2598.

In a typical differential services environment, DS nodes located at the border of the DS domain ("edge devices") mark or "color" each IP packet for a particular flow with a specific DSCP value based on the currently established QoS policies. Such coloring may involve loading the DS field 132 of a packet with a particular DSCP value. Thereafter, the interior DS compliant devices ("core devices") along the path apply the corresponding forwarding behavior to the packet based on the particular DSCP value.

For example, a QoS policy typically includes a filter or Boolean expression that indicates which packets are to be colored, and with what DSCP values. Conventionally, a network administrator selects one or more QoS policies based on a predetermined priority factor. For example, a network administrator may select a QoS policy that colors all Voice Over IP (VOIP) packets with a high priority DSCP value (for example "60") but which marks all email packets with a low priority DSCP value (for example "10"). Thus, various DSCP values may be associated with various services.

Deficiencies of Past Approaches

In general, the network administrator is responsible for defining the QoS that is provided within a network. Conventionally, to achieve a specified per-hop-behavior for a particular QoS, a policy management station instructs DS-compliant network nodes that are within its management domain to color each packet for a particular flow with a static DSCP value. Thereafter, the DS nodes within the DS domain forward the packets through the network based on packet's color. However, a drawback with coloring the packets for a particular flow with static DSCP values is that the per-hop-behavior that is applied to each flow does not take into account the dynamic state of the network. In particular, the then-current loading or available bandwidth of the network is not taken into account. Thus, the coloring of packets based on the static DSCP values can reduce the throughput or bandwidth that is achieved within a DS domain as unutilized bandwidth cannot be shared among the different flows. As a result, network performance suffers.

For example, an online trading application that generates stock quote messages may be assigned a DSCP value "60" that provides a target bandwidth of fifty percent (50%). Additionally, the corporate financial information messages may be assigned a DSCP value of "45" that provides a target bandwidth of forty percent (40%), while the data backup messages may be assigned a DSCP value of "15" that provides a target bandwidth of ten percent (10%). Thus, regardless of the current bandwidth that is available in the network for each particular flow, all stock quote message packets are colored with a DSCP value of "60", all corporate financial information message packets are colored with a DSCP value of "45", all data backup message packets are colored with a DSCP value of "15". Therefore, even if the network has more available bandwidth (for example because the network is not currently routing any stock quote messages), all incoming data backup message packets will be colored with the static DSCP value of "15" and thus not take advantage of the available unused bandwidth.

Moreover, the bandwidth that is allocated for each color (DSCP value) must be shared between all flows having the same color (i.e., assigned the same "service level"). Therefore, the actual forwarding behavior that is applied to a particular flow is determined not only by the color of a particular flow (i.e., GOLD, SILVER, BRONZE, etc.), but also by the number of active flows that are currently associated with the same service level (i.e., having packets with the same DSCP value). Thus, although a network administrator may require that all VOIP flows be given a minimum amount of bandwidth within the network, multiple flows sharing the same service level may actually receive or be allocated less than a desired minimum amount of bandwidth and in certain situations, may actually receive less bandwidth than flows that are specifically colored to receive lower bandwidth allocation (i.e., associated with a lower service level).

For example, a network administrator may require that all VOIP flows be associated with the service level GOLD so that they are allocated fifty percent (50%) of the network bandwidth while all email flows be associated with the service level Bronze so that they are allocated twenty percent (20%) of the network bandwidth. However, using the conventional marking methods, if the GOLD service level includes five VOIP flows that are concurrently active in the network, each VOIP flow will be allocated approximately ten percent (50% divided by 5 equals 10%) of the network bandwidth. In addition, if Bronze service level includes only one email flow that is currently active in the network, the email flow will be allocated twenty percent (20% divided by 1 equals 20%) of the network bandwidth. Thus, in certain situations, flows having a service level of GOLD may actually receive less network bandwidth than flows having a service level of BRONZE. Therefore, depending on the current network traffic, although an administrator may require that flows associated with a particular "high" service level be allocated a higher percentage of the network bandwidth than flows that are associated with a lower service levels, the high service level flows may actually receive less bandwidth than flows associated with a Lower Service level.

In another past approach, network devices differentiate among the service classes represented by DSCP values based on propagation factor or drop factor. With the Differential Service approach to providing QoS policies across the network, all network flows are divided into several service levels by assigning a specific DSCP value to each packet. Each service level receives special treatment by the network devices.

In conventional implementations of QoS policies, network devices differentiate between service levels based on two factors. The first factor is a propagation factor that determines whether a share of the bandwidth is to be allocated to all flows of the service, or that a strict propagation priority should be maintained so that packets of high priority service are transmitted before the packets of lower priority service. The second factor is a drop factor that indicates the ability of packets to survive (i.e., not to be dropped in the case of traffic congestion). Both of these factors provide only qualitative or relative parameters of the service level that the flows will receive over the network domain. As such, the actual level of service that each flow actually receives, depends on (1) the network load level at each moment and (2) the number of flows (and their aggregate rate) having the same service level. If the network is overloaded, a less preferable service level can be oppressed or discriminated against beyond the level the application can tolerate. If too many flows are mapped to the same service level, the flows will compete with each other for the resources allocated to that service level. Thus, each flow may receive worse service than is defined for its service level.

In addition, in heterogeneous network environments, it is possible that some devices are configured with limited scheduling features, such as a small number of buffer queues. Because of limited scheduling features, in certain situations, multiple service levels may be required to be mapped to a single buffer queue. Thus, flows that are associated with a lower or less preferred service level may actually depress or reduce the performance of flows that are associated with a higher or more preferred service level.

Based on the foregoing, there is a need for a mechanism for reducing resource competition and performance degradation caused by too many flows being mapped to the same service level.

There is also a need for a mechanism that takes into account the actual traffic load of the network when allocating resources for data flows associated with the same service level.

In addition, there is also a need for mechanism that can provide a higher degree of control and predictability when applying a QoS to flows within a DS domain.

SUMMARY OF THE INVENTION

According to one aspect of the invention, a mechanism is provided for adaptively enforcing Quality of Service (QoS) policies for one or more flows of packets in a packet-switched network based on network feedback information. In this aspect, packets of a first group of flows are assigned to a first service level. Then-current interface congestion information for network traffic that is mapped to the first service level and that is passing through an interface of a network device in the network is received. Based on the then-current interface congestion information one or more flows from the first group of flows are selected. Packets from the one or more flows are then assigned to a second service level.

According to another aspect, data flows associated with a first service level and data flows associated with a second service level are both assigned to a first network device resource. Then-current interface congestion information is received for network traffic that is mapped to the first network device resource. Based on the then-current interface congestion information data flows associated with the second service level are reassigned to a second network device resource.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a partial block diagram of a network message.

FIG. 1B is a partial block diagram of a network message.

FIG. 1C is a partial block diagram of a network message.

FIG. 5 is a flow diagram that illustrates a method for using network feedback information for enforcing QoS policies.

DETAILED DESCRIPTION OF THE PREFERRED EMBODIMENT

A feedback mechanism is provided for monitoring and maintaining a level of service that is required by a plurality of data flows having the same service level. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A feedback mechanism is provided for monitoring and maintaining a "desired" level of service that is required by a plurality of data flows associated with the same service level. In one embodiment, the packets of a plurality of data flows associated with the same service level are colored using an initial marking value. The traffic flow of the network is analyzed to determine the number of packets that are dropped within the network using the initial marking value. Based on the number of dropped packets, a new marking value is calculated and used for coloring subsequent packets within the plurality of data flows. By dynamically marking the packets of data flows that are associated with the same service level, the feedback mechanism provides a method for implementing adaptive QoS policies that maintains the level of service that is required by the service levels within a network.

Figure 2:
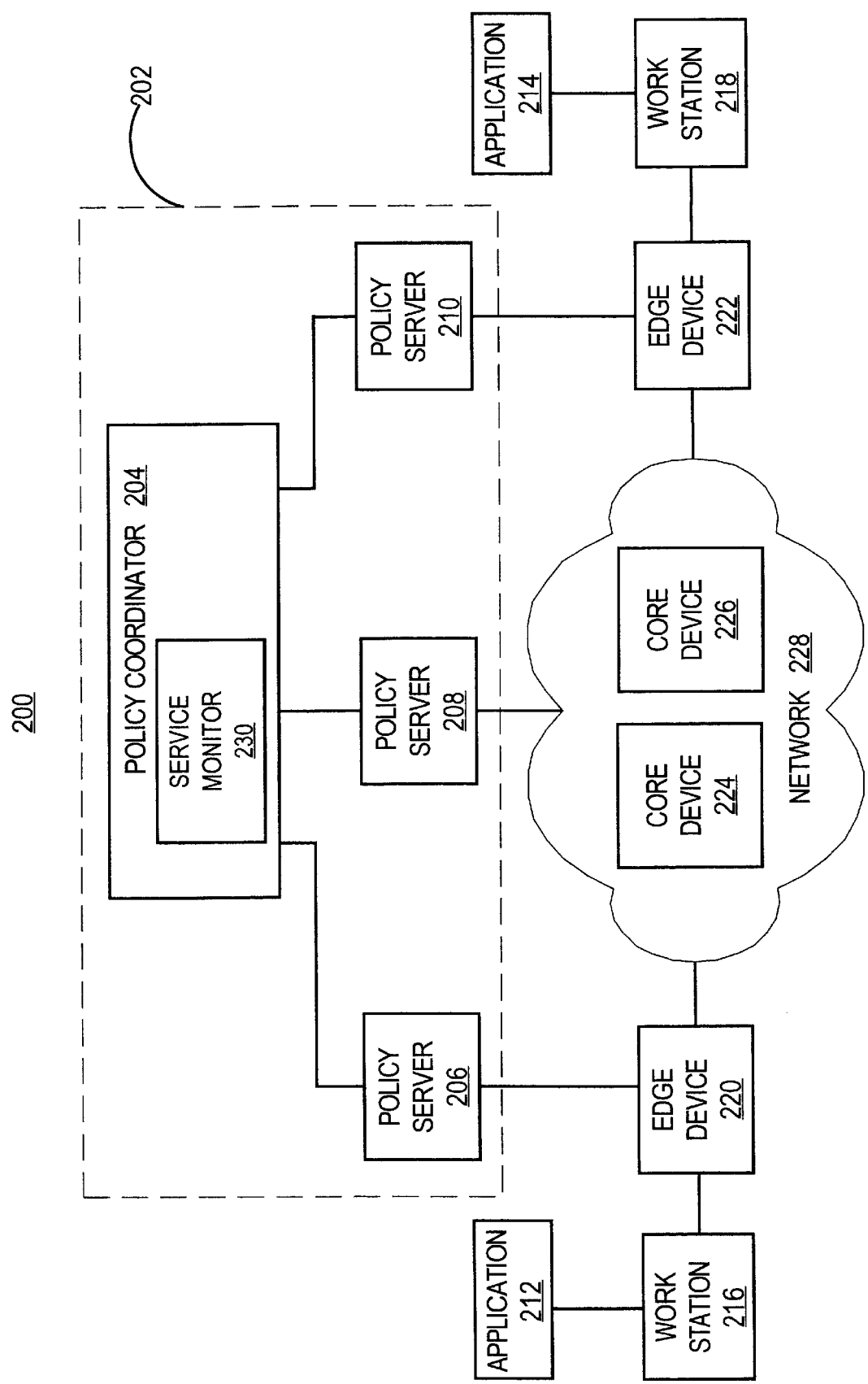
FIG. 2 is a block diagram of a computer network in which in which the present invention may be utilized.

FIG. 2 is a block diagram of a computer network 200 illustrating certain elements of an embodiment. Generally, computer network 200 includes one or more network devices 220, 222, 224, 226 a plurality of workstations 216, 218, a policy management station 202 and a network 228.

Network devices 220, 222 represent edge network devices such as routers, switches, or other similar or equivalent devices that are configured for coloring packets within network 228. In one embodiment, network devices 220, 222 are configured to execute the Cisco Internetworking Operating System (IOS) and are capable of marking packets with DSCP values, i.e., they are compatible with Differentiated Services. Such marking may be carried out using a marker or other software element or application that runs under control of IOS, e.g., an agent or process. Network devices 224, 226 represent internal network devices such as routers, switches, or other similar or equivalent devices that are configured for forwarding packets within network 228 based the color of each packet. In certain embodiments, network devices 224, 226 are configured to execute the Cisco Internetworking Operating System (IOS) and are capable of forwarding packets based on their DSCP values, i.e., they are compatible with Differentiated Services. It should be noted that network devices 220, 222 and network devices 224, 226 may in fact represent similar or even identical device types and/or models that are each configured to perform a designated function within computer network 200.

Workstations 216, 218 may be personal computers, workstations, or other network end stations at which work is done, such as printers, scanners, facsimile machines, etc. In certain embodiments, workstations 216, 218 may themselves be network devices, such as bridges, gateways, routers or switches that allow computer network 200 to connect to another network system. For example, workstation 216 may be an edge device that is configured for coloring packet of a different DS domain. In certain embodiments, workstations 216, 218 execute one or more applications 212, 214. Applications 212, 214 may represent a variety of different computer applications that execute on workstations 216, 218 respectively and which cause data to be sent and received over network 228.

Network 228 is a network system comprising any number of network devices. Network 228 may form part of a LAN or WAN. In one embodiment, network 228 is a packet-switched IP network configured as a DS domain whereby treatment of packets that flow through network 228 is controlled and managed by Policy Management Station 202 and network devices 220, 222, 224, 226.

Policy Management Station 202 is a computer, or a group of hardware or software components or processes that cooperate or execute in one or more computer systems. In this example, Policy Management Station 202 includes a policy coordinator 204 and one or more policy servers 206, 208, 210, that are coupled to network devices 220, 222, 224, 226. In one embodiment, policy coordinator 204 communicates with policy servers 206, 208, 210 to configure the network devices 220, 222, 224, 226, to control the coloring and forwarding of packets within network 228. For example, policy coordinator 204 may direct network devices 220, 222 to color the packets of all Voice Over IP (VOIP) flows with the color gold (high priority) and to color the packets of all File Transfer Protocol (FTP) flows with the color Bronze (low priority). Each color corresponds to a particular service level and is associated with one or more QoS treatment parameters, e.g., a pre-defined DSCP value and possibly other values or characteristics. Policy coordinator 204 may further direct network devices 224, 226 to apply a particular forwarding policy based on the particular color of each packet that is processed.

In one embodiment, Policy Management Station 202 provides a mechanism whereby a network administrator may select or define a desired service level that is to be applied to a particular group of data flows within network 228. For example, an administrator may choose to have a service level of Gold be applied to all VOIP flows within computer network 200. In response, policy coordinator 204 communicates with the policy servers to cause edge devices 220, 222 to set an initial DiffServ Codepoint value in the packets of all VOIP flows. An example of a commercial product suitable for use as Policy Management Station 202 is CiscoAssure QoS Policy Manager 1.0, commercially available from Cisco Systems, Inc.

In certain embodiments, policy coordinator 204 includes a service monitor 230 that consists of one or more hardware or software elements that are configured to collect dropped packet information based on the number of packets that are dropped by network devices 220, 222, 224, 226 within network 228. Based on the dropped packet information, service monitor 230 determines whether a particular service level is receiving the required level of service. If service monitor 230 determines that a particular service level is not receiving the required level of service (e.g., packets belonging to that service level are being dropped), service monitor 230 determines an updated QoS treatment policy for achieving the required service level for the associated group of data flows. Service monitor 230 then communicates the updated QoS treatment policy to markers or other elements of devices 220, 222 to dynamically color the packets of each flow to better meet the specific bandwidth needs of the data flows. Examples of how dropped packet information may be determined is described in detail below.

Although the example embodiment of FIG. 2 shows two (2) workstations 216, 218, three (3) policy servers 216, 208, 210, two (2) edge devices 220, 222, and two (2) core devices 224, 226, in other practical embodiments there may be any number of such elements. In addition, Policy Management Station 202 is provided as only an example of one type configuration that may be used to manage QoS policies.

Thus, as understood by those in the art, Policy Management Station 202 may be configured as a single component or instead variety of different distributed components that are configured for implementing adaptive QoS policies to maintain the level of service that is required by the service levels within a network. In addition, although not depicted in FIG. 2, in certain embodiments, policy servers 206 and 210 are coupled to network 228 and thus may communicate with edge devices 220 and 222 over network 228.

Service Level Packet Marking

Figure 3:
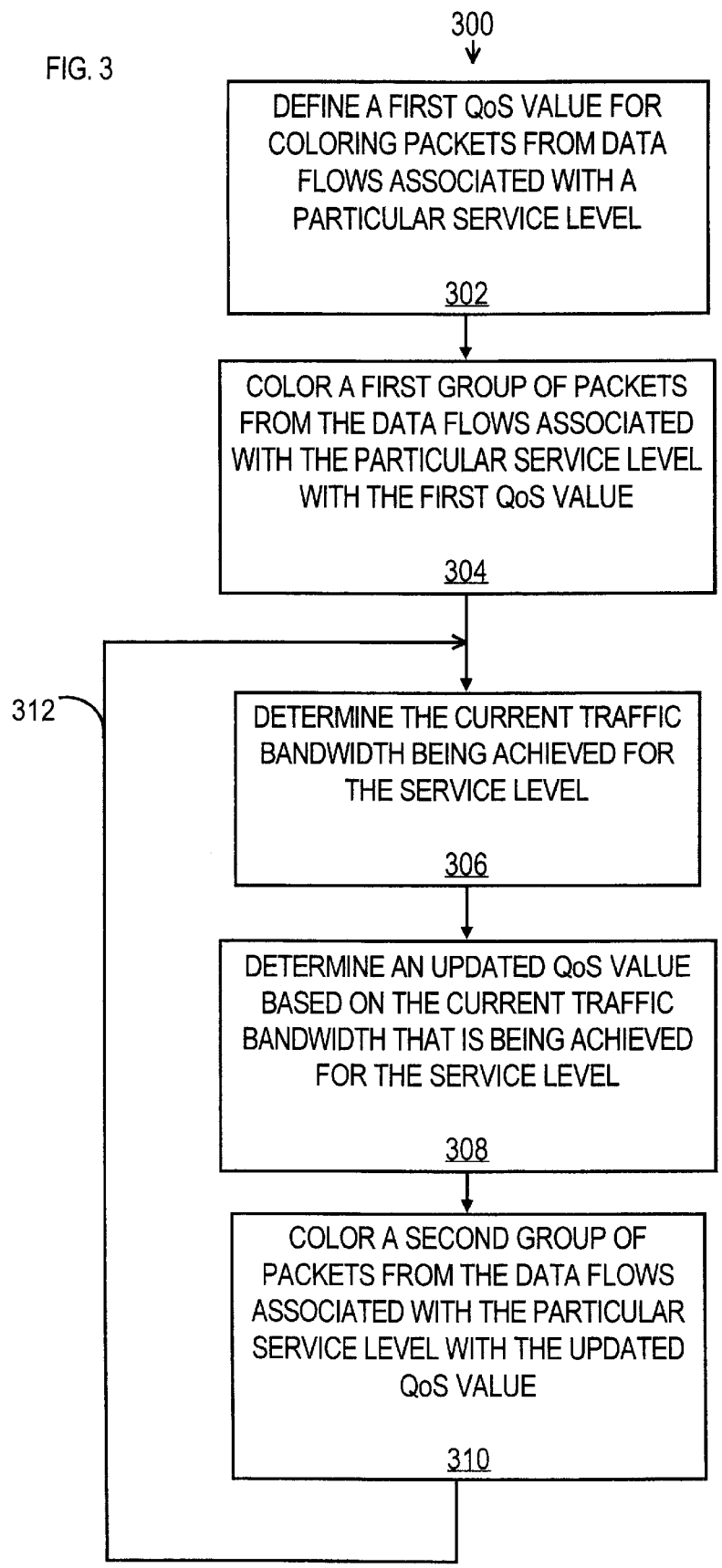
FIG. 3 is a flow diagram that illustrates a method for implementing adaptive QoS policies for maintaining a level of service for a particular service level.

FIG. 3 is a flow diagram 300 that illustrates a method for performing service level packet marking in accordance with certain embodiments of the invention. For explanation purposes, the blocks of FIG. 3 are described in reference to the components of FIG. 2. However, embodiments of the methods disclosed herein are not limited to the example embodiment that is shown in FIG. 2.

At block 302, a first QoS value is defined for coloring packets of data flows associated with a particular service level. For example, by interfacing with Policy Management Station 202 an administrator may define a desired service level for a particular group of flow types, for example a service level of Gold for all VOIP flows. In defining the service level, a QoS policy is established whereby for example, the VoIP packets are initially colored with a DSCP value "X" for providing a desired "high" forwarding priority (for example a DSCP value of "50" allocating 50% of the network bandwidth) for the GOLD service level.

Block 302 may also involve defining QoS values for a plurality of service levels. For example, Block 302 may also involve defining a service level of Bronze for all FTP flows and establishing a QoS policy such that all FTP packets are initially colored with a DSCP value "Y" for providing a desired "low" forwarding priority (for example a DSCP value of "20" allocating 20% of the network bandwidth) for the BRONZE service level.

At block 304, a first group of packets from the data flows associated with the service level are colored with the first QoS value. Block 304 may involve communicating the initial QoS value to each of the edge devices so that the devices can use the values to color the flow packets that are associated with the service level. For example, in response to an administrator defining a QoS policy that assigns a desired service level of GOLD to all VOIP flows, the Policy Management Station 202 communicates the initial QoS value, for a DSCP value of "50", to edge devices 220, 222. Thereafter, edge devices 220, 222 begin applying the QoS policies by coloring the packets of each data flow associated with the service level GOLD based on the initial QoS value.

At block 306, the current traffic bandwidth that is being achieved by the different data flows that are associated with the particular service level is determined. Several methods may be used to determine the bandwidth that is allocated to each flow assigned to a particular service level. In one embodiment, the bandwidth that is allocated to each flow of a particular service level is determined based on the number of packets that are dropped within the network from flows associated with the service level. For example, by comparing the number of packets that are contained in the first group of packets with the number of first group of packets that are dropped, dropped packet information can be obtained for the particular service level. As is described detail below, several techniques may be used to determine the number of packets that are dropped for a particular service level. In one embodiment, service monitor 230 communicates with devices 224, 226 to collect corresponding dropped packet information for the particular service level.

At block 308, based on the current bandwidth that is being allocated to the flows assigned to the particular service level, an updated QoS value may be selected for coloring packets of one or more data flows associated with the service level. For example, if service monitor 230 determines that the flows associated with the GOLD service level are receiving less than a desired amount of the network bandwidth, service monitor 230 may determine that the packets of one or more of the data flows should now be marked with a new DSCP value so as to reassign those flows to a different service level (for example the SILVER service level), thus allocating additional bandwidth for the flows still associated with the GOLD service level.

Alternatively, if the service monitor 230 determines that the bandwidth that is allocated to flows assigned to a particular service level may be decreased, service monitor 230 may update the DSCP value that is associated with flows of another service level to cause those flows to be reassigned to that particular service level. For example, if service monitor 230 determines that the flows associated with the SILVER service level are not fully utilizing their allocated bandwidth, service monitor 230 may determine that one or more flows currently associated with the BRONZE service level can be reassigned (promoted) to the SILVER service level. Thus, service monitor 230 may direct the edge devices 220, 210 to begin marking the packets of one or more flows associated with the BRONZE service level with a DSCP value that is associated with the SILVER service level.

In one embodiment, the service monitor 230 selects the updated QoS values based on the minimal amount of service level that is required to efficiently service a particular service level. In addition, in certain embodiments, if it is determined that flows of a particular service level are not receiving the required bandwidth, service monitor 230 may update the actual service level. For example, if it is determined that a group of VoIP flows associated with the GOLD service level are not receiving the required amount of bandwidth, service monitor 230 may determine that the group of VoIP flows should be associated with a PLATINUM service level. Service monitor 230 may then re-assign the group of VoIP flows such that they are assigned a "higher" service level of PLATINUM and thus allocated an additional amount of bandwidth within the network.

At block 310, a second group of packets from the data flows associated with the particular service level are colored with the updated QoS value. Block 310 may involve communicating the updated QoS value to each of the edge devices so that the devices can use the values to color the flow packets that are to be assigned a new service level. For example, the Policy Management Station 202 may communicate an updated QoS value, for example a DSCP value of "50", to edge devices 220, 222 for marking packets of one or more selected flows associated with the GOLD service level. Thereafter, edge devices 220, 222 apply the updated QoS policy by coloring the packets of the one or more selected flows with the updated QoS value to reassign the selected flows to a new service level.

As illustrated in FIG. 3 by path 312, the process of dynamically monitoring and maintaining a desired bandwidth level can be repeated to continually and/or periodically tune the service levels to enhance the efficiency of a network system.

Adjusting Bandwidth Levels Based on Dropped Packet Information

Each DS node that forwards flow packets through the network is configured with a limited amount of resources, for example internal buffer space and link or interface bandwidths. Conventionally, these resources are divided among the different service levels, and therefore affect the treatment of flows within the network. For example, the DS nodes for a particular DS domain may be configured so that fifty percent (50%) of their buffer space is allocated for packets of flows associated with a service level of GOLD, thirty percent (30%) of the buffer space is allocated for packets of flows associated with a service level of SILVER, and twenty percent (20%) of the buffer space is allocated for packets of flows associated with a service level of BRONZE.

Figure 4A:
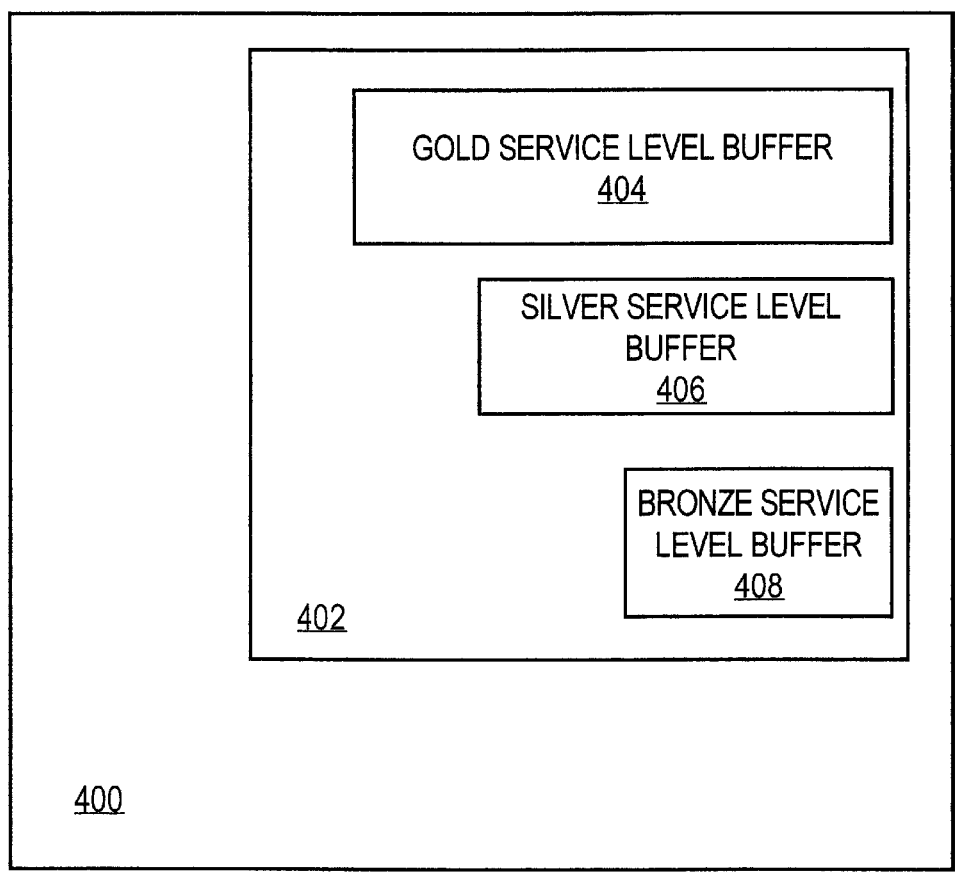
FIG. 4A is a block diagram that illustrates an example network device that includes a partitioned buffers space for implementing QoS policies.

FIG. 4A is a block diagram that illustrates an example network device 400 that includes a buffers space 402 that is used to implement QoS policies. Buffers space 402 is partitioned into three separate buffers that include a GOLD service level Buffer 404, a Silver service level Buffer 406, and a BRONZE service level Buffer 408. Each buffer 404,406,408 is used to buffer packets that are received by device 400 for a particular service level. For example, the GOLD service level Buffer 404 is used to buffer flow packets that are associated with a service level of GOLD, the Silver service level Buffer 406 is used to buffer flow packets that are associated with a service level of SILVER, and the BRONZE service level Buffer 408 is used to buffer flow packets that are associated with a service level of BRONZE.

The bandwidth of a particular service level and each flow assigned with this service level may be directly affected by the amount of buffer space that is allocated for the particular service level. If the buffer space allocated for a particular service level is small, relative to the number of packets that are received for the particular service level, packets may be dropped due to the lack of buffer space. In general, the number of packets that are dropped by a service level buffer can provide an indicator as to whether a particular service level has appropriate bandwidth available for each flow (i.e., if the service level is either over-loaded or under-loaded).

A variety of techniques may be used to determine the number of packets that are dropped for a particular service level. For example, in one embodiment, service monitor 230 uses MIB variable information to determine the number of packets that are dropped for a particular service level. Such MIB variable information may include, but is not limited to, values of RMON2 MIB variables, DSMON MIB variables and the CISCO-CAR-MIB, CISCO-CLASS-BASED-QOS-MIB and the CBWFQ_CISCO_MIB variables.

If it is determined that an undesirable number of packets for a particular service level are dropped too frequently, a variety of actions may be taken adjust the bandwidth that is allocated to flows of a particular service level. Likewise, if it is determined that a particularly small number of packets are dropped for a particular service level, a variety of actions may also be taken adjust the bandwidth of flows assigned to the particular service level.

Figure 4B:
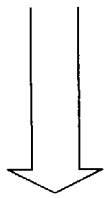
FIG. 4B illustrates the reassigning of flows from one service level to another.

For example, FIG. 4B illustrates a QoS policy that includes an initial resource mapping 420 that maps DSCP values to service levels and service levels to buffers. In one embodiment, if Policy Management Station 202 determines that a network device is dropping an undesirable amount of packets by GOLD service level buffer 404 (i.e., packets of flows associated with the GOLD service level), Policy Management Station 202 may determine that the number of flows associated with the GOLD service level should be reduced.

To reduce the number of flows associated with the GOLD service level, Policy Management Station 202 may reassign one or more flows associated with the GOLD service level to a different service level. In one embodiment, a group of one or more flows are reassigned to a different service level by updating or changing the DSCP values that are assigned to the packets of the group of one or more flows. For example, resource mapping 422 of FIG. 4B illustrates an example of an initial mapping that may exist within a network system. As depicted, flows associated with the VOIP service and flows associated with the HTTP service are both initially assigned DSCP values (DSCP value "63" and DSCP value "55" respectively) that map to the GOLD service level. If Policy Management Station 202 determines that an undesirable amount of packets are being dropped for services associated with the GOLD service level (for example, for VOIP flows), Policy Management Station 202 may determine that the number of flows associated with the GOLD service level should be reduced. As depicted in updated resource mapping 424, to reduce the number of flows associated with the GOLD service level, Policy Management Station 202 may direct the edge devices 220, 222 to begin marking the packets of the HTTP flows with an updated DSCP value of "50" so as to reassign the HTTP flows to the SILVER service level. By updating the initial DSCP value that is used to mark packets of a particular flow, the number of flows that are associated with a particular service level may be dynamically changed to provide additional bandwidth for those flows that remain associated with the particular service level. In this example, by reassigning packet of flows associated with the HTTP service to the SILVER service level, the bandwidth for flows associated with the VOIP service can be dynamically increased.

Adjusting Buffer Assignments

In certain situations, the number of different service levels may exceed the number of buffers that are available within a network device. In this case, two or more service levels will need to map to a single buffer.

Figure 4C:
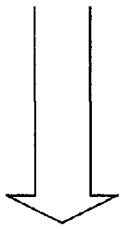
FIG. 4C illustrates the reassigning of service level from one buffer to another.

For example, FIG. 4C illustrates a resource mapping 430 that maps both the SILVER and BRONZE service levels to buffer 406. Thus, packets of flows associated with either the SILVER or BRONZE service level will compete with each other for use of buffer 406. In one embodiment, if Policy Management Station 202 determines that the packets of flows associated with the SILVER service level are being dropped at an undesirable rate, Policy Management Station 202 may update the mapping of the BRONZE service level to reduce the number of flows that are associated with buffer 406. For example, by updating resource mapping 430 to update the mapping of flows associated with the BRONZE service level from buffer 406 to buffer 408, the number of flows that are associated with buffer 406 may be dynamically changed to provide an updated resource mapping 440 to provide the desired amount of bandwidth for flows associated with the SILVER service level.

Enforcing QoS Policies Based on Network Feedback

FIG. 5 illustrates a method for using network feedback for enforcing QoS policies. For purposes of illustrating an example, the blocks of FIG. 5 are described in reference to the components of FIG. 2 and FIG. 4A–4C. However, the method of FIG. 5 is applicable to any other appropriate system of network elements.

At block 502, information is created and stored that defines one or more interfaces that are expected to be overloaded. For example, a system administrator may identify devices or interfaces of the network that are likely to cause "bottlenecks" in forwarding traffic through the network. These bottlenecks may include such items as a WAN interface or other slow link interfaces that are expected to overload.

At block 504, a prioritized list of service levels is created and stored. In one embodiment, the list provides priority ordered set of service levels to which a particular flow may be reassigned when an interface is overloaded. For example, as depicted in resource mapping 420 of FIG. 4B, information describing the mapping of DSCP values to service levels and service levels to available buffers may be collected and stored for a network device such as core device 224.

At block 506, statistical information is periodically retrieved from one or more of the interfaces of the network. In one embodiment, the statistical information includes dropped packet information that identifies the number of packets that an interface dropped for a particular service level. The statistical information may be obtained from various MIB variables. For example, policy server 208 may be configured to collect dropped packet information for core devices 224, 226.

At block 508, the collected statistical information is distributed to the policy servers. For example, the statistical information may be distributed to edge devices 220, 222.

At block 510, the number of packets entering the network during the last sampling interval is determined for the particular service level.

At block 512, to determine whether the dropped packet threshold has been exceeded, the number of dropped packets is compared to the number of packets that entered the network during the last sampling interval the particular service level. If the dropped packet threshold has not been exceeded, then process returns to block 510. For example, if it is determined that no packets have been dropped for a particular service level, then in general no flow adjustments are required to increase the service level's bandwidth.

Conversely, if the dropped packet threshold has been exceeded, then an interface is overloaded and one or more flows are reassigned to different service levels to relieve the overload condition. As shown at block 514, one or more flows associated with the particular service level are reassigned to a new service level. For example, as depicted in resource mapping 422 and 424 of FIG. 4B, packets of flows associated with the HTTP service are given updated DSCP values to reassign the flows from the GOLD service level to the SILVER service level. Alternatively, if a second service level is mapped to the same buffer as this particular service level, as previously described if FIG. 4C, the second service level may be reassigned to a different buffer to increase the service of the particular service level.

At block 516, the reassignment information is distributed to the edge devices. For example, policy servers 206 and 210 may respectively distribute the reassignment information of resource mapping 424 to edge devices 220 and 222.

At block 518, the Policy Management Station 202 waits for the devices to acknowledge the reassignments. This allows the changes to be synchronized and made consistent throughout the network system.

As illustrated in FIG. 5 by return path "A", the method of using network feedback for enforcing QoS policies can be repeated to continually or periodically tune the service levels to enhance the efficiency of a network system.

Methods for Reducing Service Level Congestion

In addition to or instead of reassigning flows to service levels or service levels to buffers, a variety of actions may be taken when it determined that a service level is not receiving the desired service. For example, the buffer space that is allocated for a particular buffer may be increased or decreased based on the number of packets that are being dropped for the assigned service levels.

Also, one or more flows that are associated with the service level may be blocked and/or edge devices may be directed to stop coloring packets of new flows for the particular service level to provide an increased amount of bandwidth for the particular service level. Additionally, devices configured with the RSVP may be directed not reserve bandwidth for a particular flow or service level. Moreover, an application such as application 212, 214 may be notified that the desired bandwidth is not being achieved for a particular service level. The application may also be interrogated as to what action should to be taken.

Hardware Example

Figure 6:
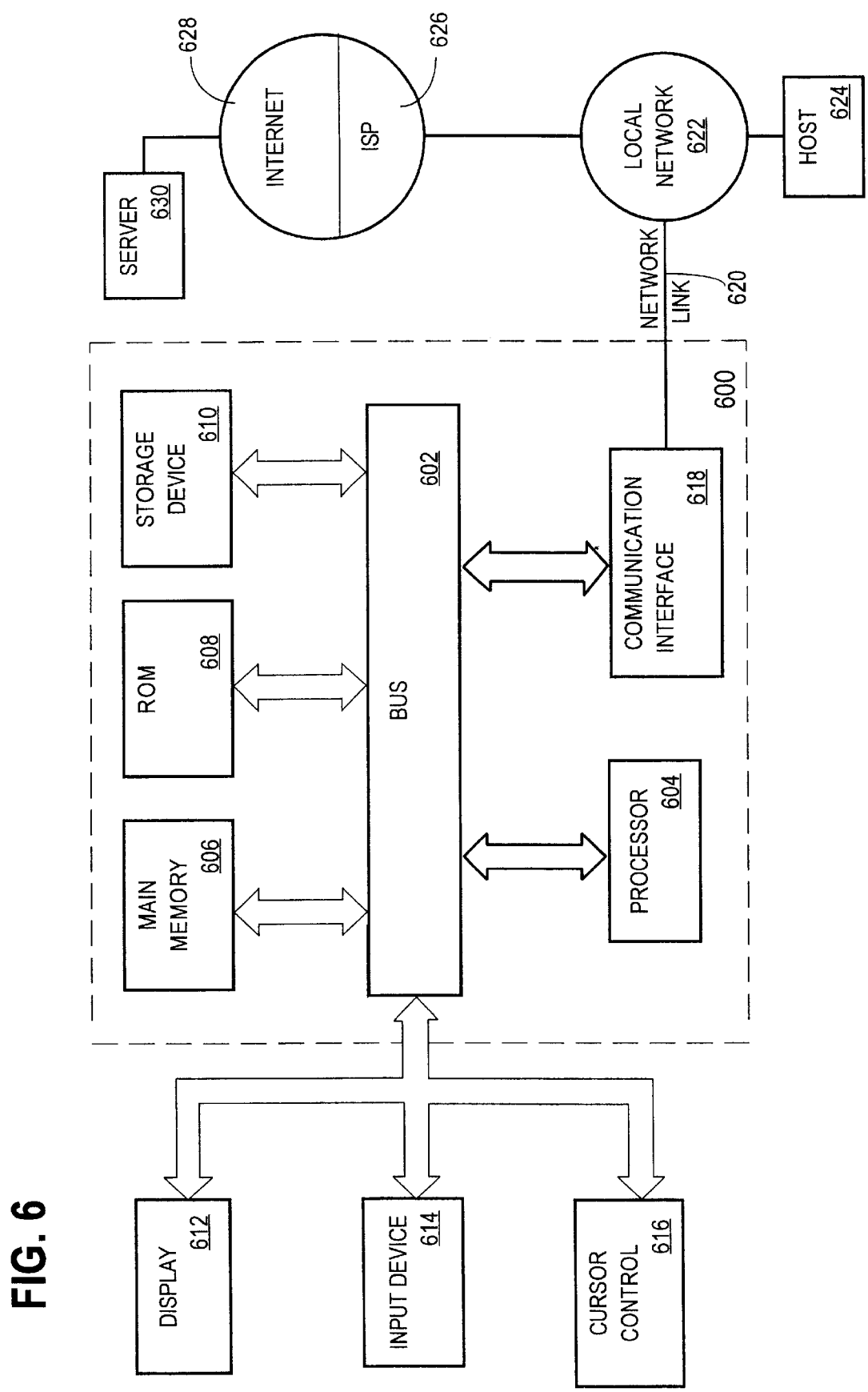
FIG. 6 is a block diagram of a computer system with which an embodiment may be carried out.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for adaptively enforcing network quality of service policies in a network system based on feedback about network conditions. According to one embodiment of the invention, an adaptive quality of service policy mechanism is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for adaptively enforcing network quality of service policies in a network system based on feedback about network conditions as described herein.

The received code may be executed by processor 604 as it is received, and/or stored in storage device 610, or other non-volatile storage for later execution. In this manner, computer system 600 may obtain application code in the form of a carrier wave.

Alternatives, Extensions

The adaptive policy enforcement mechanism as described herein provides for the dynamic reassignment of flows to service levels and of service levels to buffers based on the service that is currently being provided by a particular service level within a network. By periodically determining the number of packets that are being dropped for a particular service level, decisions can be dynamically made to determine whether flows associated with a service level are receiving the desired bandwidth. If it is determined that a service level and/or any particular flow associated with the service level is not receiving the desired bandwidth, several action, including the reassignment of DSCP values to service levels, flows to service levels and service levels to buffers may be performed to increase the service level's bandwidth. Thus, the network can perform more efficiently as available bandwidth can be dynamically distributed to the different flows within the network to achieve a more desirable network throughput and to provide for more reliable and predictable network services. In one aspect, packet flow characteristics are used to identify data flows that would benefit from receiving additional bandwidth within the network and to identify data flows whose current bandwidth allocation may be reduced, at least temporarily.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

For example, although FIG. 2 illustrates a single policy management station 202, in certain embodiments, multiple policy management station 202 can be used for adaptively enforcing network quality of service policies in a network system based on feedback about network conditions. In addition, although not depicted, in certain embodiments, policy servers 206, 210 may be coupled to and thus communicate with edge devices 220, 222 via network 228.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for adaptively enforcing Quality of Service (QoS) policies for one or more flows of packets in a packet-switched network based on network feedback information, comprising the computer-implemented steps of:

assigning packets of a first group of flows to a first service level;

receiving then-current interface congestion information for network traffic that is mapped to said first service level and that is passing through an interface of a network device in the network;

selecting one or more flows from the first group of flows based on the then-current interface congestion information;

reassigning packets from said one or more flows to a second service level; and wherein the step of receiving then-current interface congestion information includes the steps of:

directing one or more network devices to collect dropped packet information for at least one of said first group of flows associated with said first service level; and retrieving said dropped packet information from said one or more network devices for said at least one of said first group of flows associated with said first service level.

2. A method as recited in claim 1, wherein the step of receiving then-current interface congestion information includes the step of collecting dropped packet information, wherein the dropped packet information indicates an amount of packets that were dropped by the interface for flows of the first service level.

3. A method as recited in claim 2, wherein the step of selecting one or more flows from the first group of flows includes the step of selecting said one or more flows from the first group of flows based on said dropped packet information.

4. A method as recited in claim 1, wherein the step of assigning packets of a first group of flows includes the step of assigning the packets of said first group of flows based on a differentiated services codepoint (DSCP) value that is associated with the packets of said first group of flows.

5. A method as recited in claim 1, wherein the step of assigning packets of a first group of flows includes the step of creating a mapping of data flows to service levels, wherein the mapping identifies a level of service that is desired for a particular data flow.

6. A computer-readable medium carrying one or more sequences of instructions for adaptively enforcing Quality of Service (QoS) policies for one or more flows of packets in a packet-switched network based on network feedback information, wherein execution of the one or more sequences of instructions by one or more processors causes the one or more processors to perform the steps of:

assigning packets of a first group of flows to a first service level;

receiving then-current interface congestion information for network traffic that is mapped to said first service level and that is passing through an interface of a network device in the network;

selecting one or more flows from the first group of flows based on the then-current interface congestion information;

reassigning packets from said one or more flows to a second service level; and wherein the step of receiving then-current interface congestion information includes the steps of:

directing one or more network devices to collect dropped packet information for at least one of said first group of flows associated with said first service level; and retrieving the dropped packet information from said one or more network devices for said at least one of said first group of flows associated with said first service level.

7. A computer-readable medium as recited in claim 6, wherein the step of receiving then-current interface congestion information includes the step of collecting dropped packet information, wherein the dropped packet information indicates an amount of packets that were dropped by the interface for flows of the first service level.

8. A computer-readable medium as recited in claim 7, wherein the step of selecting one or more flows from the first group of flows includes the step of selecting said one or more flows from the first group of flows based on said dropped packet information.

9. A computer-readable medium as recited in claim 6, wherein the step of assigning the packets of a first group of flows includes the step of assigning packets of said first group of flows based on a differentiated services codepoint (DSCP) value that is associated with the packets of said first group of flows.

10. A computer-readable medium as recited in claim 6, wherein the step of assigning packets of a first group of flows includes the step of creating a mapping of data flows to service levels, wherein the mapping identifies a level of service that is desired for a particular data flow.

11. A computer apparatus comprising:

a processor; and a memory coupled to the processor, the memory containing one or more sequences of instructions for adaptively enforcing Quality of Service (QoS) policies for one or more flows of packets in a packet-switched network based on network feedback information, wherein execution of the one or more sequences of instructions by the processor causes the processor to perform the steps of:

assigning packets of a first group of flows to a first service level;

receiving then-current interface congestion information for network traffic that is mapped to said first service level and that is passing through an interface of a network device in the network;

selecting one or more flows from the first group of flows based on the then-current interface congestion information;

reassigning packets from said one or more flows to a second service level; and wherein the step of receiving then-current interface congestion information includes the steps of:

directing one or more network devices to collect dropped packet information for at least one of said first group of flows associated with said first service level; and retrieving said dropped packet information from said one or more network devices for said at least one of said first group of flows associated with said first service level.

12. A computer apparatus as recited in claim 11, wherein the step of receiving then-current interface congestion information includes the step of collecting dropped packet information, wherein the dropped packet information indicates an amount of packets that were dropped by the interface for flows of the first service level.

13. A computer apparatus as recited in claim 12, wherein the step of selecting one or more flows from the first group of flows includes the step of selecting said one or more flows from the first group of flows based on said dropped packet information.

14. A computer apparatus as recited in claim 11, wherein the step of assigning packets of a first group of flows includes the step of assigning the packets of said first group of flows based on a differentiated services codepoint (DSCP) value that is associated with the packets of said first group of flows.

15. A computer apparatus as recited in claim 11, wherein the step of assigning packets of a first group of flows includes the step of creating a mapping of data flows to service levels, wherein the mapping identifies a level of service that is desired for a particular data flow.

16. A computer apparatus comprising:

means for assigning packets of a first group of flows to a first service level;

means for receiving then-current interface congestion information for network traffic that is mapped to said first service level and that is passing through an interface of a network device in the network;

means for selecting one or more flows from the first group of flows based on the then-current interface congestion information;

means for reassigning packets from said one or more flows to a second service level; and wherein the receiving then-current interface congestion information means includes:

means for directing one or more network devices to collect dropped packet information for at least one of said first group of flows associated with said first service level; and means for retrieving said dropped packet information from said one or more network devices for said at least one of said first group of flows associated with said first service level.

17. A method for adaptively enforcing Quality of Service (QoS) policies for one or more flows of packets in a packet-switched network based on network feedback information, comprising the computer-implemented steps of: assigning data flows associated with a first service level to a first network device resource;

assigning data flows associated with a second service level to said first network device resource;

receiving then-current interface congestion information for network traffic that is mapped to said first network device resource;

reassigning data flows associated with said second service level to a second network device resource based on said then-current interface congestion information; and wherein the step of receiving then-current interface congestion information includes the steps of:

directing one or more network devices to collect dropped packet information for at least one of said first group of flows associated with said first service level; and retrieving said dropped packet information from said one or more network devices for said at least one of said first group of flows associated with said first service level.

\* \* \* \* \*